United States Patent [19]
Suzuki

[11] 3,881,806
[45] May 6, 1975

[54] ELECTRO-OPTICAL DISPLAY DEVICE
[75] Inventor: Toshihiro Suzuki, Suwa, Japan
[73] Assignee: Kabushiki Kaisha Suwa Seikosha, Tokyo, Japan
[22] Filed: July 13, 1973
[21] Appl. No.: 378,852

[30] Foreign Application Priority Data
July 13, 1972 Japan.................. 47-69526

[52] U.S. Cl............................. 350/160 LC; 252/299
[51] Int. Cl................................................ G02f 1/16
[58] Field of Search....... 350/160 LC; 252/299, 408

[56] References Cited
UNITED STATES PATENTS
3,731,986  5/1973  Fergason.................... 350/160 LC
3,795,436  3/1974  Boller et al.................. 350/160 LC OTHER PUBLICATIONS
Schadt: "Dielectric Properties of corne Nematic Liquid Crystals with Strong Positive Dielectric Anisotropy," Jour. of Chem. Phys., Vol. 56, Feb. 15, 1972, pp. 1494–1497.
Brown: "Liquid Crystals and Some of Their Applications in Chemistry," Analytical Chemistry, Vol. 41, Nov. 1969, pp. 26A–39A.

Primary Examiner—Edward S. Bauer
Attorney, Agent, or Firm—Blum Moscovitz Friedman & Kaplan

[57] ABSTRACT

An electro-optical display device utilizes a new type of nematic liquid crystal which in the absence of an electric field rotates the plane of polarized light whereas in the presence of an electric field the compound permits polarized light to travel therethrough with the plane of polarization unaltered. The compounds utilized have a nitrile group therein as a result of which the dipole moment of the molecule coincides with the axis of the molecule so that the material has a positive dielectric anisotropy. The device may be used for displaying time in a watch.

9 Claims, 2 Drawing Figures

ELECTRO-OPTICAL DISPLAY DEVICE

BACKGROUND OF THE INVENTION

Although a great number of liquid crystal compounds are known, most of these compounds have a negative dielectric anisotropy due to the fact that their dipole moment is transverse to the principal axis of the molecule. As a result, in using such materials in an electro-optical display device, the device is so constructed that application of an electric field across a thin layer of a compound gives rise to turbulence and dispersion of incident light. By applying the electric field to selected portions of the device containing the liquid crystal compound, it is possible to display indicia or images.

In order to make the light dispersed by the liquid crystal material more evident, it is necessary that the background against which the display is to be observed be black. Alternatively, a black dye or pigment can be incorporated in the composition. However, there are limitations on the range of utility of such devices imposed by factors such as the degree of contrast obtainable, the rate of relaxation of molecules in turbulence once the field is removed, and the resolution obtainable. All of these considerations arise from the fact that the materials used hitherto are characterized by negative dielectric anisotropy.

SUMMARY OF THE INVENTION

An electro-optical device in accordance with the present invention utilizes a composition having from 5 to 50 percent of a molecule having the structural formula:

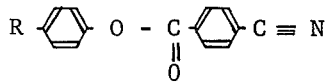

where "R" is an alkyl, alkoxyl or acyloxy radial containing from 1 to 10 carbon atoms. These materials, due to the presence of a nitrile group are characterized by a positive dielectric anisotropy, as a result of which they align themselves with an electric field imposed across a layer of a composition containing said compound. The compound, when in the absence of an electric field in excess of about six volts has optical rotatory power. Consequently, it is possible to alter the plane of polarized light passing therethrough and to eliminate said alteration by imposing an electric field across a layer of the material or a composition containing a sufficient quantity of said material.

Accordingly, an object of the present invention is an improved electro-optical device utilizing a liquid crystal material including a nitrile group for altering the plane of polarization of polarized light.

Another object of the present invention is an improved electro-optical device wherein the effect of a layer of a composition containing said compound can be changed by imposing an electric field thereon.

A further object of the present invention is an improved electro-optical device wherein a compound having the general formula

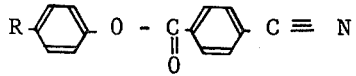

is used as a means of permitting or preventing the passage of light therethrough by imposition of an electric field.

Yet another object of the present invention is a watch including an electro-optical display device using liquid crystals having positive dielectric anisotropy for displaying time.

Still other objects and advantages of the invention will in part be obvious and will in part be apparent from the specification.

The invention accordingly comprises a composition of matter possessing the characteristics, properties, and the relation of components which will be exemplified in the composition hereinafter described and an article including said composition of matter, and the scope of the invention will be indicated in the claims.

BRIEF DESCRIPTION OF THE DRAWING

For a fuller understanding of the invention, reference is had to the following description taken in connection with the accompanying drawing in which.

DESCRIPTION OF THE PREFERRED EMBODIMENTS

The display device of the present invention depends on the use of a compound having the structural formula

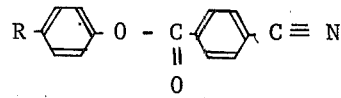

where "R" is an alkyl, an alkoxy or an acyloxy radical. Compounds of this type having a nitrile group therein, are characterized by a positive dielectric anisotropy, as a result of which in the presence of an electric field the principal axis of the molecule becomes oriented with the field. When free of a field strong enough to orient the molecules, the material has optical rototary power, as a result of which the plane of polarization of polarized light passing therethrough is rotated. It has been found convenient to utilize from 5 to 50 percent by weight of such compounds in combination with nematic liquid crystals having negative dielectric anisotropy. The positive dielectric anisotropy of the materials of the present invention is sufficiently great so that when used in compositions to the extent of 5 to 50 percent by weight in combination with nematic liquid crystals having negative dielectric anisotropy the desired effect of rotating the plane of polarized light is obtainable. The objective in using the materials of the present invention in combination with more ordinary nematic liquid crystals is to increase the temperature range over which devices utilizing the compounds of the present invention may be used.

Figure 1:
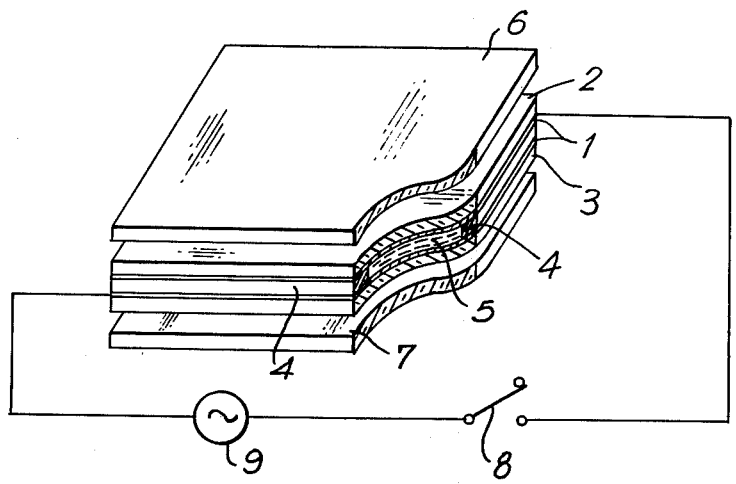
FIG. 1 is a partially cut-away exploded view of a device in accordance with the present invention.

A device using compositions in accordance with the present invention is shown in FIG. 1 wherein transparent electro-conductive coatings 1 on the interior of transparent glass plates 2 and 3 together with insulating spacer 4 define a space containing liquid crystal material 5. Polarizing plates 6 and 7 which are essentially co-extensive with glass plates 2 and 3 complete the multi-layer structure. Conductive coatings 1 and 2 are connected by means of leads on switch 8 to voltage source 9 which may supply either an AC or a DC voltage. With the compounds of the present invention it is preferable that the voltage be at least 6V.

Although the quantity of the compounds of the present invention between plates 2 and 3 may be usch as to rotate the plane of polarized light by any desired angle, in general, it is preferable to rotate the plane of polarization by 90°. Two types of construction are possible, depending on the preferred mode of operation. If the planes of polarization of plates 6 and 7 are parallel to each other and the quantity of the liquid crystal of the present invention between plates 2 and 3 is such as to rotate the plane of polarized light by 90° then the device will be non-transmitting or opaque in the absence of an adequate electric field. However when an electric field exceeding, say, 6 volts is impressed across the liquid crystal material, the device permits plane-polarized light to pass therethrough. If axes of polarizing members 6 and 7 are at right-angles to each other, and the quantity of liquid crystal is such as to rotate the plane of polarization by 90°, then, in the absence of an electric field, light incident on plate 6 will be transmitted through the system as plane-polarized light. The imposition of an electric field will destroy the optical rotatory power of the liquid crystal composition, as a result of which the device will act as an optical shutter, cutting off the light.

Figure 2:
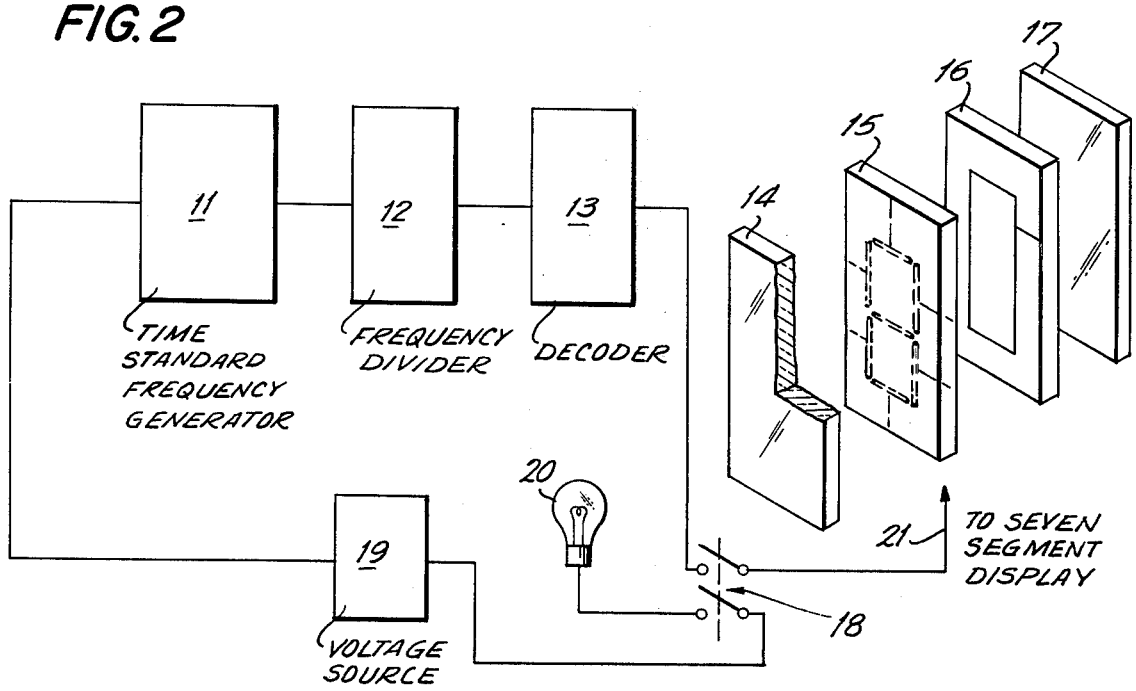
FIG. 2 is a wrist-watch using an electro-optical display device in accordance with the present invention for displaying time.

A display device in accordance with the present invention is particularly suitable for use as a time-display means in a wrist watch. Such an arrangement is shown schematically in FIG. 2 where time standard frequency generator 11 is driven by voltage source 19 and supplies a high frequency signal to frequency divider 12 which then drives decoder 13 for supplying suitable signals to the electro-optical device of the present invention. The electro-optical device has two polarizer plates 14 and 17 on either side of transparent glass plates 15 and 16, between which is a layer of liquid crystals (not shown) adapted to rotate the plane of polarized light by 90°. Plate 15 has on the interior surface thereof a standard 7-segment numerical display or any other suitable arrangement for presenting an indicium and plate 16 has a transparent electro-conductive layer thereon which can be activated so that an electric field can be selectively applied to desired portions of the display in order to present a digit corresponding to the time. For this type of display, the polarization axes are parallel to each other so that, as a result of the 90° rotation produced by the liquid crystal material, no light is transmitted through the device. However, when switch 18 is closed, voltage is applied between the conductive area on glass plate 16 and the selected segments of the indicium on plate 15 to destroy the optical rotation of the liquid crystal across which the field is applied, thereby making the device transparent and the selected digit visible.

The source of light can be a tungsten lamp, a neon tube or any other convenient source so placed that light from a source such as lamp 20 falls in an appropriate direction upon the device. Conveniently, connection from decoder 13 to the numerical display on plates 15 and 16 is made by a double throw switch 18 which simultaneously activates lamp 20. With this arrangement, lamp 20 is turned on only when it is desired to read the time, thus avoiding excessive drain on voltage source 19, which is usually a battery. It should be noted that with proper construction of the system, lamp 20 can be replaced by ambient light.

Temperature characteristics of the new compounds in accordance with the present invention are shown in Table 1.

TABLE 1

| compounds | Temperature Characteristics (°C) |
|---|---|
| 4-n-butylphenyl-4'-cyanobenzoate | C → 70 → I, 50 ↘ N ↗ 62 |
| 4-n-hexylphenyl-4'-cyanobenzoate | C → 68 → I, 45 ↘ N ↗ 62 |
| 4-n-heptylphenyl-4'-cyanobenzoate | C → 65 → I, 45 ↘ N ↗ 63 |

Table 1—Continued

| compounds | Temperature Characteristics (°C) |
|---|---|
| 4-n-octylphenyl-4'-cyanobenzoate | C ⇌ 66 N ⇌ 73 I |

C: crystal

N: nematic liquid crystal

I: isotropic liquid

Where "R" is a short radical (in the formula given above), these compounds tend to form monotropic liquid phases. For example, in the case of the compound 4-n-butylphenyl-4'-cyanobenzoate

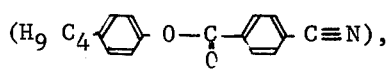

when the material is heated, it melts at 70°C into an isotropic liquid. When the liquid is cooled, it crystallizes at 62°C into a nematic liquid crystal. When further cooled, it solidifies at 50°C.

Where the radicals are long, the compounds take enantiotropic liquid crystal phases. For instance, the compound 4-n-octylphenyl-4'-cyanobenzoate

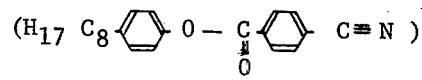

forms a nematic liquid crystal phase within the range of 66°C to 73°C.

The temperature characteristics of the liquid crystal compositions produced by mixing the above-mentioned compounds and other nematic liquid crystals are shown in Table 2.

TABLE 2

| compositions | temperature characteristics |
|---|---|
| a composition containing 20% 4-n-butylphenyl-4'-cyanbenzoate ($H_9 C_4$—⌬—O—C(=O)—⌬—C≡N) 40% of 4-methoxybenzylidyne-4'-n-butylaniline ($C H_3$ O—⌬—CH=N—⌬—$C_4 H_9$) and 40% of 4-ethoxybenzylidyne-4'-n-butylaniline ($C_2 H_5$ O—⌬—CH=N—⌬—$C_4 H_9$) | C ⇌ 0 N ⇌ 55 I |
| a composition containing 20% 4-n-butylphenyl-4'-cyanobenzoate ($H_9 C_4$—⌬—O—C(=O)—⌬—C≡N) 30% of p-(p'-methoxyphenylazo) phenylbutane | |

TABLE 2 (Continued)

| compositions | temperature characteristics |
|---|---|
| ( CH₃O—⟨⟩—N=N—⟨⟩—C₄H₉ ) <br> 30% of p-(p'-ethylphenylazo) phenyl-hexanoate <br><br> ( C₂H₅—⟨⟩—N=N—⟨⟩—O—C(=O)—C₅H₁₁ ) <br> and 20% of p-(p'-n-propylphenylazo) phenylheptanoate <br><br> ( C₃H₇—⟨⟩—N=N—⟨⟩—O—C(=O)—C₆H₁₃ ) | C ⇌ N ⇌ 1 <br> 0    55 |

The quantities given are merely examples and are not to be considered limitative.

In the above compositions the content of the nitrile compound is 20 percent. However, as aforenoted, the positive dielectric anisotropy is sufficient at a concentration of 5 percent to give the desired effect, and the content can be increased to as high as 50 percent, depending on the temperature characteristics of the final product.

The method of synthesis is simple and can be used whether the substituent on the phenol compound is alkyl, alkoxy or acyloxy. The procedure is to react p-substituted phenol and p-cyanobenzoylchloride in ether under reflux with triethylamine as catalyst. Purification of the compound is carried out by repeated crystallization from hexane until either the lower transition temperature or the upper transition temperature becomes constant.

It will thus be seen that the objects set forth above, among those made apparent from the preceding description, are efficiently attained, and, since certain changes may be made in the above composition of matter and in the article including said composition of matter, without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In an electro-optical display device, the combination comprising a liquid crystal composition including at least one compound having the formula

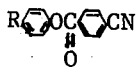

where R is a radical selected from the group consisting of alkyl, alkoxy and acyloxy radicals, each radical containing from 1 to 10 carbon atoms; a pair of opposed transparent plates each having a transparent conductive film on the interior surface thereof, between which said composition is held as a thin layer, said conductive films being connectable to a voltage source; and a pair of light-polarizing members disposed proximate the exterior surfaces of each of said transparent plates, the optical axes of said light-polarizing members being so related to each other that imposition and removal of an electric field across said liquid crystal composition substantially alters the transmission of light through said device.

2. The combination as defined in claim 1 wherein the concentration of said compound in said composition and the thickness of said layer of said composition are such that light passing therethrough in the absence of an electric field is rotated through 90°.

3. The combination as defined in claim 2, wherein the axes of said polarizing plates are parallel to each other so that an electric field must be imposed across said layer for light to be transmitted through said device.

4. The combination as defined in claim 2, wherein the axes of said polarizing plates are perpendicular to each other so that an electric field must be impressed across said thin layer in order to prevent transmission of light through said device.

5. The device as defined in claim 1 wherein said composition contains from 5 to 50 percent of said compound.

6. The device as defined in claim 1 wherein said composition consists essentially of nematic liquid crystal compounds having a liquid crystal phase within the range of 0°C to 73°C.

7. The device as defined in claim 1 wherein said composition consists essentially of 20 percent 4-n-butylphenyl-4' cyanobenzoate, 40 percent of 4-methoxybenzylidyne-4'-n-butylaniline, and 40 percent of 4-ethoxybenzylidyne-4'-n-butylaniline.

8. The device as defined in claim 1 wherein said composition consists essentially of 20 percent 4-n-butylphenyl-4' cyanobenzoate, 30 percent of p-(p'-methoxyphenylazo) phenylbutane, 30 percent of p-(p'-ethylphenylazo) phenylhexanoate, and 20 percent of p-(p'-n-propylphenylazo) phenylheptanoate.

9. A wrist-watch including the electro-optical device as defined in claim 1, wherein one of said transparent coatings is divided into segments disposed for displaying any number from zero to nine and selectively connectable to a voltage source for destroying the optical rotatory power of liquid crystals of positive dielectric anisotropy between said selectively connectable segments and the opposed transparent conductive coating, the axes of said polarizing plates being perpendicular to each other.

* * * * *